(12) United States Patent
Silvera et al.

(10) Patent No.: US 8,301,563 B2
(45) Date of Patent: Oct. 30, 2012

(54) EMERGING TRENDS LIFECYCLE MANAGEMENT

(75) Inventors: Juan D. Silvera, Charlotte, NC (US); Ilieva Ilizastigui Ageenko, Cornelius, NC (US)

(73) Assignee: Wells Fargo Bank, N.A., Charlotte, NC (US)

(*) Notice: Subject to any disclaimer, the term of this patent is extended or adjusted under 35 U.S.C. 154(b) by 1203 days.

(21) Appl. No.: 12/120,790

(22) Filed: May 15, 2008

(65) Prior Publication Data

US 2009/0288061 A1 Nov. 19, 2009

(51) Int. Cl.
*G06Q 40/00* (2012.01)
(52) U.S. Cl. ............................. 705/42; 705/35
(58) Field of Classification Search .................. 705/35, 705/42; 707/674; 709/204; 717/120, 168
See application file for complete search history.

(56) References Cited

U.S. PATENT DOCUMENTS

| | | | | |
|---|---|---|---|---|
| 7,222,078 | B2* | 5/2007 | Abelow | 705/1.1 |
| 7,231,374 | B1* | 6/2007 | Balasinski | 705/400 |
| 7,415,715 | B2* | 8/2008 | Fradkov et al. | 719/328 |
| 7,831,535 | B2* | 11/2010 | Flinn et al. | 706/46 |
| 7,930,201 | B1* | 4/2011 | Issa et al. | 705/7.23 |
| 7,971,180 | B2* | 6/2011 | Kreamer et al. | 717/101 |
| 2003/0005411 | A1* | 1/2003 | Gerken | 717/120 |
| 2003/0033191 | A1* | 2/2003 | Davies et al. | 705/10 |
| 2005/0113092 | A1* | 5/2005 | Coppinger et al. | 455/436 |
| 2005/0114829 | A1* | 5/2005 | Robin et al. | 717/101 |
| 2007/0021992 | A1* | 1/2007 | Konakalla | 705/7 |
| 2007/0288276 | A1* | 12/2007 | Kling et al. | 705/7 |

FOREIGN PATENT DOCUMENTS

WO WO 2008025514 * 3/2008

OTHER PUBLICATIONS

"Product Idea Generator"Spotlight Marketing; www.seriouslinemoney.co.uk; Copyright 2007; pp. 1-8.*
"The Idea Generator Plus"; www.hr.com/en/communities/organizational_develop[ment/the-idea-generator-plus_e...; Aug. 4, 2007; pp. 1-11.*
Ademar Aguiar and Gabriel David; "WikiWiki Weaving Heterogeneous Software Artifacts"; ACM; Oct. 16-18, 2005; pp. 67-74.*
Zahi Irani, MarinosThemistocleous, and Peter E.D. Love; The impact of enterprise applicaiton integration on information system lifecycles; Dec. 14, 2002; pp. 177-187.*
Luke Wroblewski; Wiki Interface Design Considerations; http://www.lukew.com/ff/entry.asp?588; Sep. 27, 2007; pp. 1-17.*
Yujong Hwang and Robert A. Leitch; "Balanced Scorecard: Evening the Odds of Successful BPR"; IEEE: IT Pro: Nov./Dec. 2005; pp. 24-30.*

(Continued)

*Primary Examiner* — Ella Colbert
(74) *Attorney, Agent, or Firm* — Kegler Brown Hill & Ritter; James J. Pingor

(57) ABSTRACT

A process (and corresponding system) that defines sequential steps for the introduction, validation, and testing of business applications of emerging technologies, for example mobile banking services, is provided. The innovation provides a definable model and process for rapid innovation with a quality emphasis through efficient pipeline management and performance measurements. For example, the innovation can adhere to an enterprise's e-commerce requirements for a formalized and measurable structure to efficiently and diligently manage new ideas that have the potential to become new products and services that positively impact business.

13 Claims, 13 Drawing Sheets

OTHER PUBLICATIONS

Apte, Uday M., Sankar, Chetan S., Thakur, Meru, and Turner, Joel E.; "Reusability-Based Strategy for Development of Information Systems: Implementation Experience of a Bank"; MIS Quarterly, v14n4; Dec. 1990; p. 1.*

Hammer, Carl; "Life Cycle Management"; Information & Management, v4n2; May 1981; p. 1.*

Butler, Janet;"Automating process trims software development fat"; Software Magazine, v14n8; Aug. 1994; pp. 1-5.*

David Card; "Integrating Practical Software Measurement and the Balanced Scorecard"; IEEE; 2003; pp. 1-6.*

Wei, Ivan Boon Hong Lee, and Eng Wah Lee; "An Integrated Design Task Management Approach for Product Development Lifecycle"; IEEE; 2006; pp. 554-559.*

Wikipedia, the free encyclopedia. Application Lifecycle Management. http://en.wikipedia.org/wiki/Application_Lifecycle_Management. Last accessed Aug. 18, 2008.

Borland, The Open ALM Company. Application Lifecycle Management (ALM) Solutions. http://www.borland.com/us/solutions/index.html. Last accessed Aug. 18, 2008.

Application Lifecycle Management—define, design, develop, and deliver the right product, the right way. http://www.telelogic.com/Solutions/Application_Lifecycle_management/index.cfm. Last accessed Aug. 18, 2008.

Serena. Application Lifecycle Management for the Enterprise. http://www.serena.com/solutions/alm-solutions/index.html. Last accessed Aug. 18, 2008.

IDS. Application Life-Cycle Management. http://www.idc.com/getdoc.jsp?containerId=IDC_P240. Last accessed Aug. 18, 2008.

Shaw. SearchSoftwareQuality.com. Software Quality News: ALM 2.0: Applicaton lifecycle management changing to meet development organizations' needs. Jun. 4, 2007. http://searchsoftwarequality.techtarget.com/news/article/0,289142,sid92_gci1259517,00.html#.

TechExcel. The time for ALM is now. http://www.techexcel.com/solutions/alm/. Last accessed Aug. 18, 2008.

Borland, The Open ALM Company. Open Application Lifecycle Management (ALM) Vision. http://www.borland.com/us/company/open-alm-vision.html. Last accessed Aug. 18, 2008.

* cited by examiner

FIG. 4

Please complete this form with your suggestion. Be sure to read the disclosure at the bottom of the form.

Name: Adrian Van Cleave    Phone: 704/374-3474
                           Mail Code: NC1012
Department: Emerging Trends & Analysis    Site: Charlotte
Idea Coordinator:          Backup Idea Coordinator:

Suggestion Date: 5/16/2007

Note: If your descriptions are over 1500 characters in length, please provide the maximum amount of information below and send any additional detail to EmployeeSuggestionProgram@Wachovia.com. Please include the Suggestion Id Number in the subject line.

Describe the current situation or business issue:

Describe your improvement suggestion:

| | |
|---|---|
| ◐ | If ROI Index is equal to or less than .88, then we assign the color Red for performance. |
| ◉ | If ROI Index is between .89 and 1.00, then we assign the color Yellow for performance. |
| ◐ | If ROI Index is equal to or greater than 1.01, then we assign the color Green for performance. |

FIG. 10A

| | |
|---|---|
| ◐ | No new services launched measurement during period. |
| ◉ | 1 new service launched during measurement period. |
| ◐ | 2 or more new services launched during measurement period. |

FIG. 10B

| | |
|---|---|
| ◐ | Variance is greater than 20% of 100 calender days. |
| ◉ | Negative variance is less than 20% of 100 calender days. |
| ◐ | 100 calender days or less |

FIG. 10C

| Project or Initiative | Engagement start date | Engagement Trigger | Engagement End Date | End Event | Pilot | Total Days in ET&A Process |
|---|---|---|---|---|---|---|
| Express Switch | 7/19/2006 | Project Assignment | 12/22/2006 | Transitioned to OLS | Y | 110 |
| Podcasting / RSS | 11/16/2006 | Picked up sponsorhsip | 6/4/2007 | Pilot launch | Y | 137 |
| Fin. Center Maps / Mashup | 11/15/2006 | Picked up sponsorhsip | 4/13/2007 | Final recommendation | N | 103 |
| eVault | 11/1/2006 | Project Assignment | 3/25/2007 | No go communication to vendor | N | 98 |
| Wachovia Mobile BillPay | 1/18/2007 | Go decision | 3/19/2007 | Switched to Firethron | N | 42 |
| 724 / CWI Mobile | 3/19/2007 | Partner kick off meeting | TBD | | | #VALUE! |
| Firethorn Pilot | 12/12/2006 | Initial vendor meeting | 3/27/2007 | Pilot contract signed | Y | 72 |
| Microsoft SMB Partnership | 2/16/2007 | Vendor submits idea | 6/12/2007 | Initiative tabled for 2008 | N | 81 |
| SMS Banking | 4/12/2007 | Picked up sponsorhsip | TBD | | Y | #VALUE! |
| Recruiting Blog Pilot | 4/13/2007 | LOB submits idea | TBD | | | #VALUE! |
| Average | | | | | | 93.667 |

FIG. 11

EMERGING TRENDS LIFECYCLE MANAGEMENT

BACKGROUND

A process, such as a software development process, describes a structure of steps or phases employed in the development of a product, for example a software product. With regard to software development, today, most developers follow a series of preferred steps to define the scope of work. For example, most software developments follow the steps of defining the requirement(s), designing the architecture, testing an implementation, and finally, deployment of the application. Unfortunately, developers most often experience many obstacles in the development process which ultimately extends the timing of deployment as well as increases costs as well as lost revenue.

Today, some developers implement structured process methodologies in the development of software systems. For example, the defense industry is one industry that employs regulated ratings systems based upon process models. These ratings are used in awarding contracts in the specific industry. Today, the international standard for describing the method of selecting, implementing and monitoring the lifecycle for software is ISO 12207 (International Organization of Standardization). ISO 12207 strives to be the 'standard' that defines all the tasks required for developing and maintaining software.

In particular, the ISO 12207 procedure establishes a lifecycle process for software, including processes and activities applied during the acquisition and configuration of the services of a system. Each defined process within the ISO procedure has an associated set of outcomes. Essentially, in accordance with the Standard, there are 23 Processes, 95 Activities, 325 Tasks and 224 Outcomes.

The ISO procedure has a main objective of supplying a common structure so that the buyers, suppliers, developers, maintainers, operators, managers and technicians involved with the software development use a common language. This common language is established in the form of well defined processes. The structure of the ISO procedure was intended to be conceived in a flexible, modular way so as to be adaptable to the necessities of whoever uses it—unfortunately, it is not adequate and easily adaptable to all applications, e.g., e-commerce, within all industries, e.g., banking.

The ISO 12207 procedure is based upon two basic principles: modularity and responsibility. 'Modularity' relates to processes with minimum coupling and maximum cohesion. 'Responsibility' refers to an act of establishing a responsibility for each process, facilitating the application of the procedure in projects where many people and/or teams are involved.

In accordance with the ISO procedure, theoretically, the set of processes, activities and tasks can be adapted according to the software project. These processes are classified in three types: basic, support and organizational. The support and organizational processes must exist independently of the organization and the project being executed. The basic processes are instantiated according to the situation. As stated above, unfortunately, the conventional ISO procedure is not easily adaptable to specifically custom-designed software applications.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

The innovation disclosed and claimed herein, in one aspect thereof, comprises a process (and corresponding system) that defines sequential steps for the introduction, validation, and testing of emerging technology processes, for example, online services such as mobile banking services. Essentially, the innovation can provide a model for rapid innovation with a quality emphasis through efficient pipeline management. While many of the processes documented herein disclose systems that facilitate the introduction of emerging Internet and mobile services for enterprise external and internal customers, it is to be understood that the innovation can be employed in accordance with disparate emerging technology services implemented by other enterprises and groups. These alternative enterprises and groups can leverage the innovation and adapt for their own rapid innovative purposes.

In a particular aspect, the innovation adheres to enterprise e-commerce requirements for a formalized and measurable structure to efficiently and diligently manage new ideas that have the potential to become new products and services that positively impact business. In addition to including existing processes within e-commerce and supporting organizations, the innovation can incorporate some of the best practices, methods, and research across diverse industries, academic research, internal lessons learned and processes from past efforts to introduce new products and services more efficiently and rapidly. In still other aspects, the innovation provides a model for measuring objectively and empirically how successful the model works in terms of financial, operational and customer perspectives.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

FIG. 4 illustrates an example wiki-style user interface (UI) that facilitates tracking the lifecycle of a project in accordance with an aspect of the innovation.

FIG. 5 illustrates an example UI that facilitates input of project/product suggestions in accordance with an aspect of the innovation.

FIG. 9 illustrates an example iRise Studio-brand simulation in accordance with an aspect of the innovation.

FIG. 10A illustrates an example set of indicators that relate to overall performance in accordance with an aspect of the innovation.

FIG. 10B illustrates an example set of indicators that relate to completion index in accordance with an aspect of the innovation.

FIG. 10C illustrates an example set of indicators that relate to proof-of-business value velocity in accordance with an aspect of the innovation.

FIG. 11 illustrates an example portfolio tracking matrix in accordance with an aspect of the innovation.

DETAILED DESCRIPTION

Figure 1:
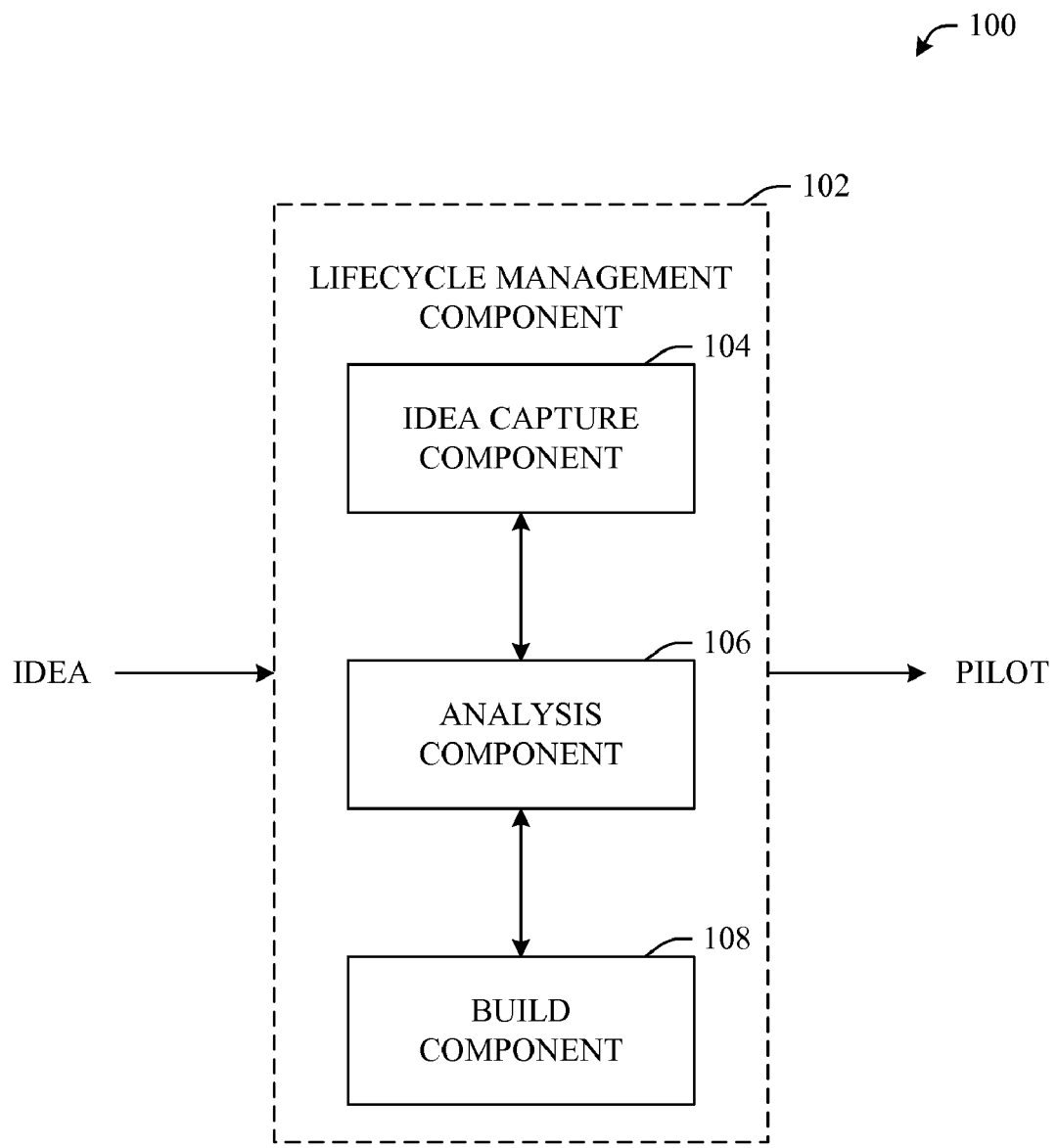
FIG. 1 illustrates an example block diagram of a system that facilitates project lifecycle management in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a thread of execution, and a component can be localized on one computer and/or distributed between two or more computers. A "process" is intended to refer to a computer-executable, computer-assisted, computer-implemented and/or otherwise definable process/method that achieves an end goal or otherwise establishes a result.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

While certain ways of displaying information to users are shown and described with respect to certain figures as screenshots, those skilled in the relevant art will recognize that various other alternatives can be employed. The terms "screen," "web page," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

Referring now to FIG. 1, a block diagram of an example system 100 that facilitates lifecycle management in accordance with the innovation is shown. Generally, system 100 includes a lifecycle management component 102 that controls development of an emerging technology process, for example, a computer-implemented process from idea to pilot. In particular, the lifecycle management component 102 can include an idea capture component 104, an analysis component 106 and a build component 108. Together, these components facilitate a comprehensive, formalized and/or measurable process of development of computer-implemented processes, for example Internet- or mobile-based financial services applications.

It is to be understood that Evaluation, Prototyping and Testing of business applications of Emerging Technologies has traditionally been a 'fuzzy' area given magnitude of the potential disruption that some emerging technologies could bring to corporations. Thus, the innovation provides mechanisms and processes which standardize and formalize development and roll-out of emerging technologies, which enhances efficiency by maximizing use of enterprise personnel and resources. The specification illustrates that new technologies should be selected for their business benefit, not merely for their technology hype. Therefore, developing a business case and performance measurements for the testing and implementation of business applications of emerging technologies are critical components to any innovation model.

Essentially, these components (102, 104, 106, and 108) can provide mechanisms by which information is input and analyzed to regulate or otherwise manage the lifecycle of a project. For instance, while information can be generated in the narrative, the idea capture component 104 can provide specific interfaces (e.g., user interfaces, templates, wizards) which enable users to input information. Similarly, ratings interfaces, templates, wizards or the like can be employed to facilitate user input for subsequent analysis. Moreover, predefined (and inferred) thresholds, criteria, benchmarks, etc, can be used to measure efficiency, establish scores, and make decisions based upon aspects of the innovation. These features, functions and benefits will be better understood upon a review of the discussion that follows.

In aspects, the innovation discloses components and processes that effect the introduction, validation, and testing of computer-implemented processes, for example an e-commerce Emerging Trends Lifecycle Management (ETLM) process that clearly defines sequential steps for the introduction, validation, and testing of new online and mobile banking services. This approach provides a model for rapid innovation with a quality emphasis through efficient pipeline management. While the example process documented here is intended to facilitate the introduction of emerging Internet and mobile services for external and internal financial services customers, the innovation is also designed so that other enterprises, for example, units within the bank, can leverage it and adapt for their own rapid innovation purposes. In other words, the features, functions and benefits of the innovation are not limited to financial-based, Internet or mobile services.

Rather, the innovation can be applied to most any lifecycle management scenario without departing from the spirit and/or scope of the innovation.

As illustrated in FIG. 1, the process components enable a formalized and measurable structure to efficiently and diligently manage new ideas that have potential to become new or viable products and services that positively impact enterprise business. In addition to including existing processes within e-commerce and supporting organizations, the innovation incorporates some of the best practices, methods, and research across diverse industries, academic research, internal lessons learned and processes from past efforts to introduce new products and services rapidly and efficiently. It is to be understood that the features, functions and benefits described herein represent a system (and corresponding process/methodology) that is inclusive of diverse thought, reflects the values and mission of an enterprise or developer, and is adoptable by most any line of business (LOB).

Figure 2:
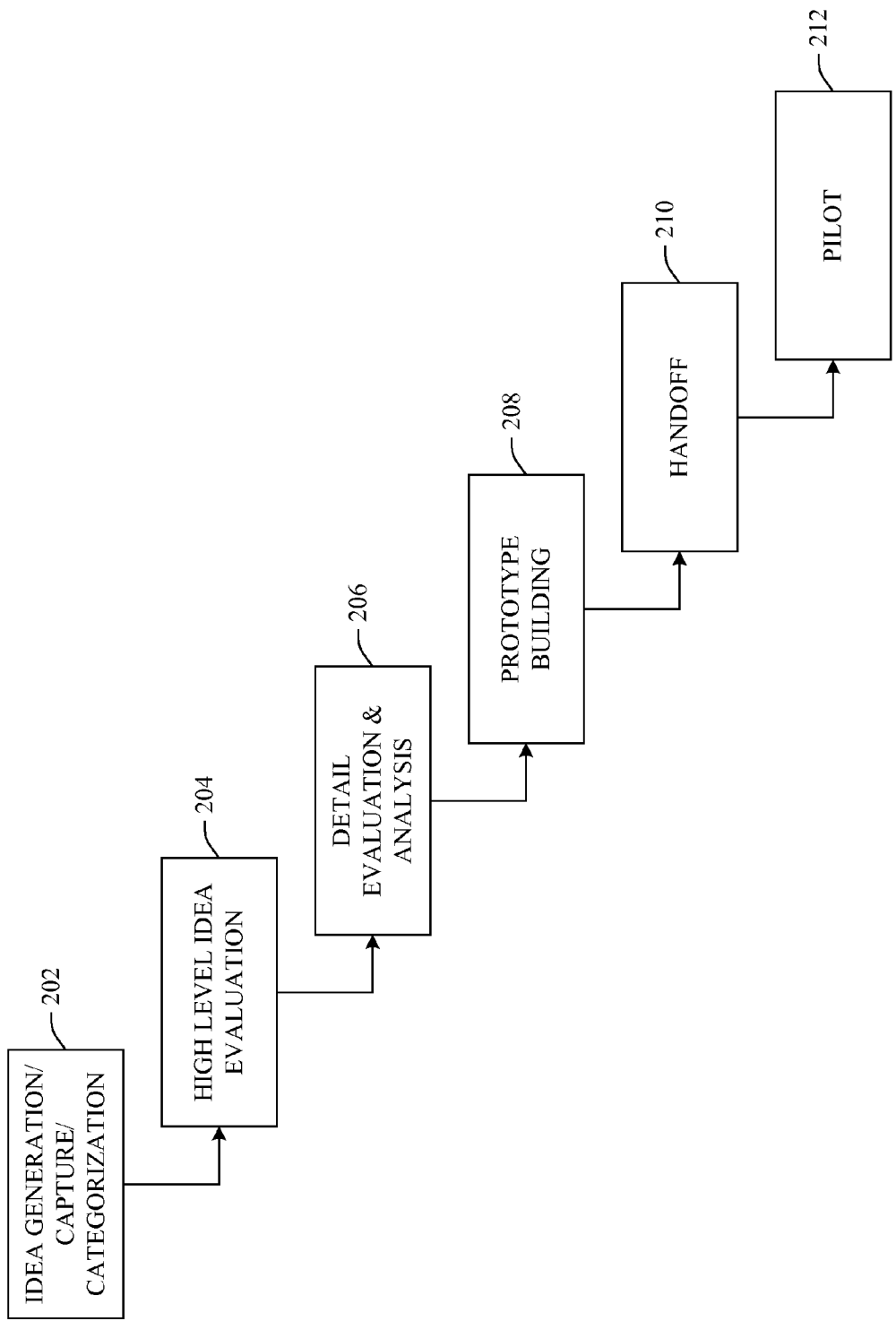
FIG. 2 illustrates an example high level flow chart of procedures that facilitate project lifecycle management in accordance with an aspect of the innovation.

FIG. 2 illustrates an example high level flow chart of managing lifecycle of an application in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 202, an idea can be generated. For example, an idea for a particular e-commerce or mobile banking application can be generated, captured and categorized. A high level evaluation can be effected at 204. For instance, at 204, an evaluation can be undertaken to establish if the idea, or portions of the idea, make good business sense. In other words, a decision can be made to determine if an enterprise will benefit from the idea.

A more detailed evaluation and analysis can be performed at 206. Here, criteria can be captured and conveyed to establish value and usability of the idea to the organization (or other organizations). It is to be understood that the evaluation and analysis acts (204, 206) can be recursive if it is determined that more information is needed to effect a comprehensive and accurate review of an idea's value. As well, it is to be understood that, in operation, interfaces, templates, wizards, etc. can be employed to capture information and/or evaluate information as desired or appropriate.

Once value is determined, a prototype can be built at 208 and handed off at 210, for example to an appropriate business unit, e.g., e-commerce. Thereafter, the business unit can pilot the application at 212. While a specific process flow is illustrated in FIG. 2, it is to be understood that alternative aspects may include additional (or fewer) acts as illustrated. Additionally, it is to be understood that the acts illustrated in FIG. 2 can be employed in an alternative order without departing from the spirit and/or scope of the innovation and claims appended hereto.

As will be described herein, the innovation discloses and captures systems, processes and methodologies that encapsulate activities and workflows associated with managing an idea portfolio and pipeline of emerging initiatives from idea generation to pilot. Accordingly, the innovation discloses examples of construction of an end-to-end process diagram mapping the flow of emerging trends lifecycle management (ETLM) and the supporting dimensions of each phase. Examples are provided infra that describe current installed process phases and provide details of tools and process documents in-use. These and other examples will be described in greater detail with reference to the figures that follow.

Close analysis of actual initiatives undertaken by the innovation show that while most projects can fit a general pattern on a macro level (documented herein), most often, no single project adheres 100% to a single process in its totality. Thus, the processes defined herein represent an average high-level flow, but one that in actual practice is susceptible to exception handling (e.g., scalable and adaptable). For example, innovation practitioners within a bank should not view this work as a rigid process, but rather as a flexible roadmap for introducing new services and products in a diligently rapid fashion.

The innovation adopts and discloses a flexible yet well-defined process through which ideas for new initiatives (e.g., e-commerce initiatives) flow from inception to production and non-value ideas can be filtered from the pipeline. For example, the framework can leverage many of the existing processes that are in use today within the e-commerce division and integrates these with proven and measurable methodologies which together they structure the ETLM innovation flow disclosed herein.

Figure 3:
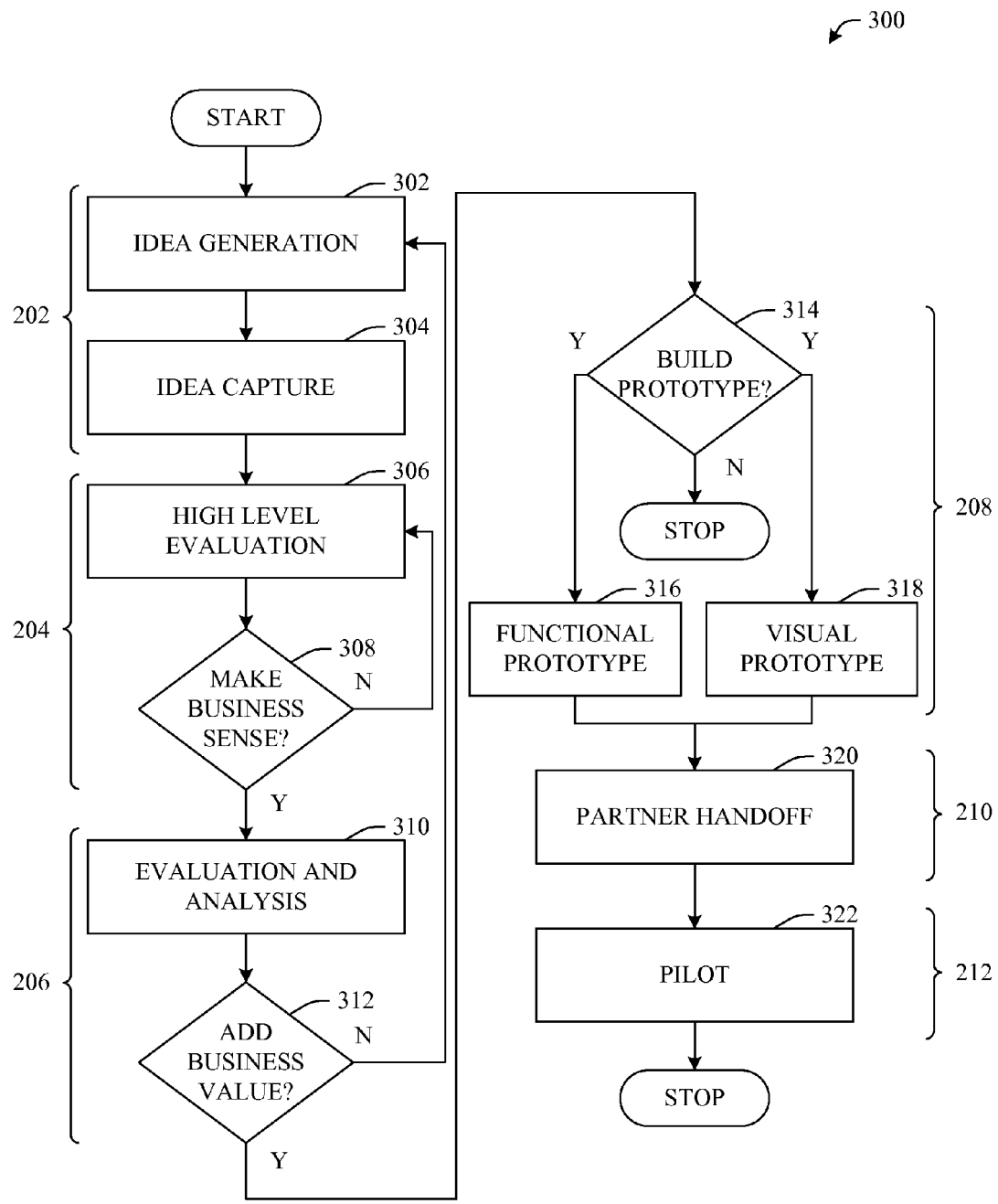
FIG. 3 illustrates an example flow chart of procedures that facilitate lifecycle analysis in accordance with an aspect of the innovation.

FIG. 3 illustrates an example ETLM process flow 300 in accordance with aspects of the innovation. One feature or benefit of ETLM is rapid product innovation in the introduction, for example introduction of new mobile or online services for e-commerce. As shown in FIG. 3, most any new product or service innovation begins with generation and capture of an idea (302, 304), and thus does ETLM. In accordance with the process of FIG. 3, the idea is initially validated or evaluated at a high level (306). Here, the idea valuation can be determined from a set of key drivers that are aligned with division and enterprise goals as well as strategic considerations.

A determination is made at 308 to establish if the idea makes sense to a particular business. If not, the process returns to 306 for further high level evaluation, or alternatively, the process stops (not shown). On the other hand, if the idea is deemed to make business sense, the flow continues to a more in-depth evaluation and analysis.

At 310, the more in depth evaluation scrutinizes the proposal by applying analysis supported by empirical data from sources including, but not limited to, voice of the customer, C.A.R.T. (Customer Analysis, Research, and Targeting), vendors, strategic benchmarking, among others. As will be understood upon a review of the figures that follow, this evaluation and analysis can establish evaluation criteria, scores, metrics or the like that can be used in the decision at 312. A determination is made at 312 to establish if business value is added. If not, the process returns to 302 to solicit new ideas. Alternatively, the process can stop (not shown). It will be understood that critical to most any development innovation model is the ability to measure the effectiveness of the system. Measurement mechanisms in accordance with the innovation will be described in more detail with reference to the figures that follow infra.

On the other hand, if the analysis supports a recommendation to pursue the project further then either a visual simulation or a functional prototype can be developed. As shown, a decision can be made at 314 to determine if either a functional prototype or a visual prototype should be developed. Alternatively, if a determination is made that neither type of prototype should be established, the process stops as shown.

As shown, if the decision to build a prototype is made, a functional prototype can be developed at 316. In other aspects, a visual prototype can be developed at 318. It is to be understood that the decision between functional and/or visual prototype can be made based upon a preference, policy, or otherwise as a function of application type in view of a particular business unit or application.

A handoff of the prototype can occur at 320. Here, the prototype can be delivered to a partner, e.g., business unit, customer or other interested party/entity. Thereafter, a pilot of the prototype can be commenced at 322. As mentioned supra, the portfolio management process is dynamic and it is at this stage where flexibility should be assumed and enabled partnerships between the prototype development team and the product owners are critically synergistic. In some instances or aspects, deviations from the process may be required, depending on the very nature of the project. This intensifies the importance of the relationship between partners during a transition period. It will be understood that it is not possible to account for each scenario evaluated where ideas become real life products; however, FIG. 3 illustrates one example process as designed by the project team.

Following is discussion of each of the process sections (202, 204, 206, 208, 210, 212) set forth on FIGS. 2 and 3. More particularly, the following discussion elaborates on each phase of ETLM and describes an example process, the partners and the tools used to navigate the pipeline from idea (202) to pilot (212).

Referring first to a discussion of the Idea Generation, Capture & Collaboration phase (202). Essentially, this phase is often controlled by a stage service level agreement. In many enterprises, employees that submit ideas are credited and often compensated for the idea. In exchange for the credit and compensation, the idea generator(s) most often assigns any rights in the idea to the enterprise or company. Essentially, at phase 202, ideas are collected from a large audience from several sources, captured and categorized. Here, the idea pipeline should be an open channel fed from the creativity of employees, vendors, business partners, and customers. As described above, the idea capture component 104 can employ interfaces, templates, wizards, etc. to enable ideas to be input into the pipeline or workflow system.

Figure 4:
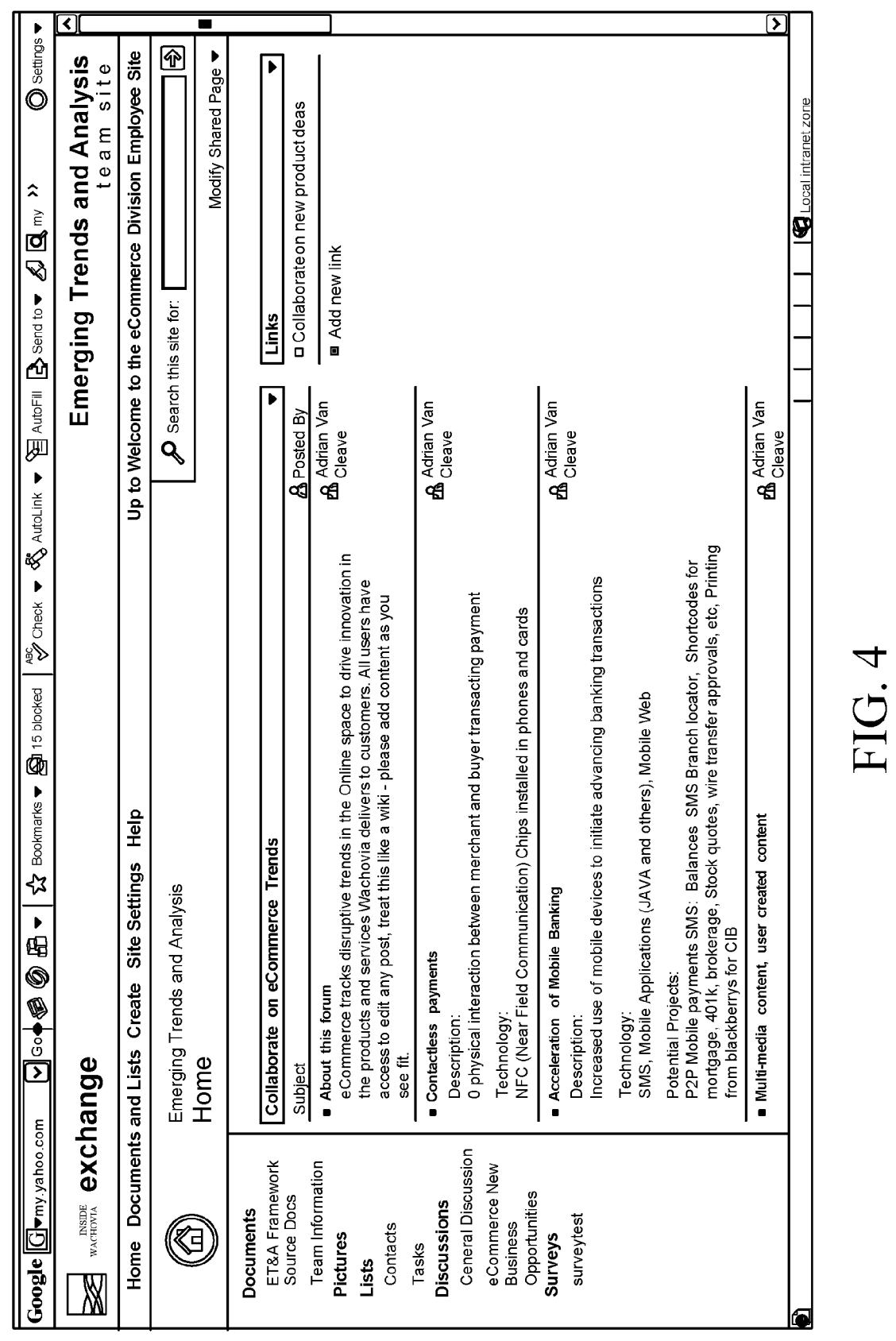

New ideas (e.g., e-commerce ideas) may originate from various sources. However, conventionally, total inclusion of all channels of ideas is limited due to the lack of a centralized idea management tool—the innovation disclosed and claimed herein. To compensate for the gap, a higher amount of effort is exercised, and tools/components provided, by the innovation to tap ideas from sources such as employees, vendors, research, etc. For example, data can be tracked in a wiki-style user interface (UI) and made available to the enterprise through the UI as shown in FIG. 4. As will be understood, the example UI of FIG. 4 can foster collaboration and publicize captured ideas.

There can be disparate efforts throughout enterprises that leverage idea generation and innovation (e.g., from employees). One example is an Operations, Technology and E-commerce idea program which utilizes an email-based system to capture suggestions and reward employees for implemented suggestions. It is contemplated by the innovation to filter these ideas down to the system 100, for example, when they are directly related to a new online or mobile service.

An example UI for inputting suggestions in accordance with an aspect of the innovation is illustrated in FIG. 5. While a specific configuration and layout of a UI is shown in FIG. 5, it is to be understood that other aspects can employ alternative configurations without departing from the spirit and/or scope of the innovation. In other words, additional or fewer input fields as well as ordering, placement or layout can be employed in alternative UI's.

As shown, the UI of FIG. 5 is capable of tracking identification information regarding the idea generator as well as the idea itself. Essentially, the UI provides a mechanism by which employees of an organization can submit ideas. It will be understood that, oftentimes, the employee is compensated in exchange for their idea(s).

Occasionally, organization partners and vendors reach out to known contacts within an organization with regard to new services. Conventionally, these proposals were not tracked across the enterprise footprint centrally. Similarly, traditionally, there was no structured mechanism for enterprise customers to submit ideas for new services (e.g., Online and Mobile services) or enhancements to be considered for development. Essentially, with regard to phase 202, the innovation enables and enhances collaboration of ideas within an enterprise or specific LOB.

Figure 6:
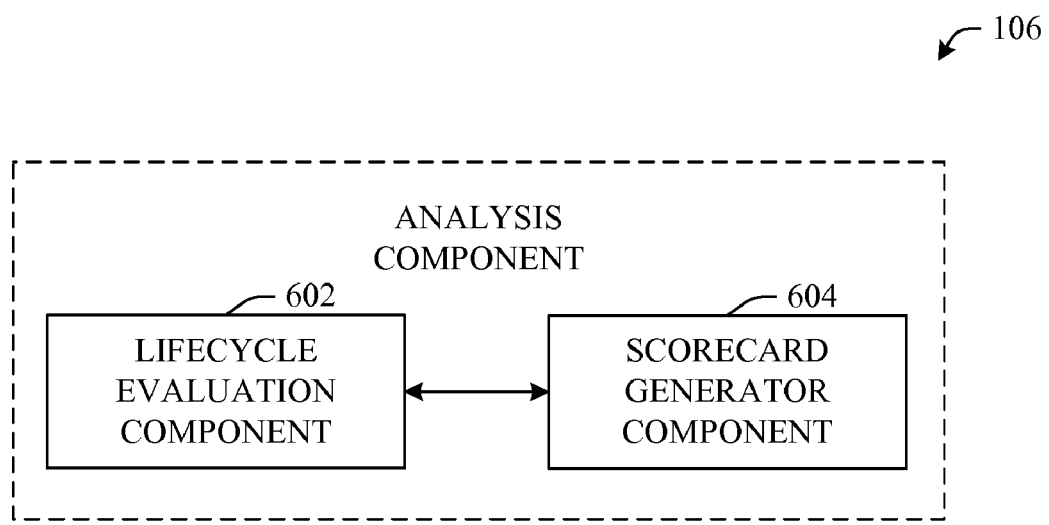
FIG. 6 illustrates an example analysis component in accordance with an aspect of the innovation.

Turning now to a discussion of phase 204, a block diagram of an example analysis component 106 is shown in FIG. 6. Generally, the analysis component 106 can include a lifecycle evaluation component 602 and a scoreboard (or scorecard) generator component 604. Each of these sub-components (602, 604) facilitate both high level (phase 204) as well as detailed analysis (phase 206) of the lifecycle.

Following is an example discussion of the process flow regarding a high level evaluation of a project lifecycle. This example contemplates a stage (or phase) service level agreement which specifies a duration of 5 calendar days. In the high level evaluation phase 204, the lifecycle evaluation component 602 employs an initial idea filter to determine worthiness of in-depth exploration and detailed analysis. Here, rules, logic, preferences, inferences etc. can be used to align potential ideas against key business drivers.

In operation, in one aspect, newly submitted ideas are added to a repository as described above and are tracked and categorized, for example, each week. As a first line filter, individual team members of the Emerging Trends team use their subject matter expertise to first decide to present a new idea before the peer group during the weekly session. They may also consult with other experts in the field of the product. New Ideas for potential initiatives can be reviewed during the team's weekly staff meeting, which means that new ideas can be evaluated within a maximum of 5-7 business days.

In operation, in one example scenario, pre-qualified new ideas are presented during a staff meeting and formally discussed by the LOB team. During this evaluation session, the proposal is evaluated, at a high level, by the collective expertise of the group against a determined set of criteria which normally maps against key business drivers and strategies. Additionally, this process can be effected by way of the lifecycle evaluation component 602 based upon predefined rules, preferences, policies or inferences.

Whenever the decision to move forward with an idea is not unanimous or if justification is warranted or desired, the team can leverage on an Evaluation Criteria Scorecard (see FIG. 8 infra) which enables initially scoring the idea critically based on:

a) Valuation Factors (Strategic Value and Business Opportunity)
b) Complexity
c) Execution Velocity
d) etc.

Figure 7:
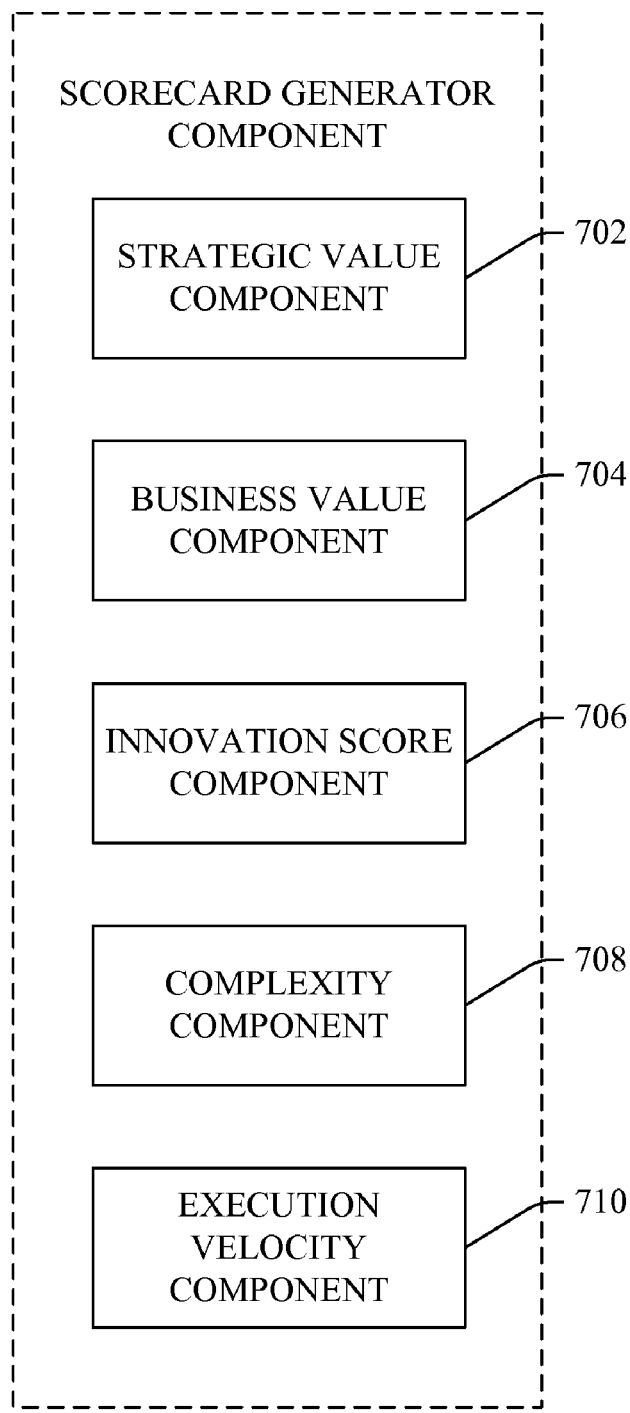
FIG. 7 illustrates an example scoreboard generator component in accordance with an aspect of the innovation.

Here, the scoreboard generation component 604 can be employed to benchmark or otherwise quantify or evaluate feasibility, usability, usefulness, etc. of an idea. An example of a scoreboard generator component 604 is illustrated in FIG. 7. Generally, the scoreboard generator component 604 can include a strategic value component 702, a business value component 704, an innovation score component 706, a complexity component 708 and/or an execution velocity component 710. These subcomponents (702, 704, 706, 708, and 710) facilitate quantification of an idea, for example, based upon an LOB's objectives, state, projections, etc.

The sub-criterion of the value factors established by the sub-components (702, 704, 706, 708, and 710) align to an organization's strategic goals. Further, although specific parameters are illustrated, it is to be understood that additional factors can be considered to determine whether or not to pursue an idea. For example and continuing with the aforementioned example, in order for any idea to be even considered it must meet two base criteria:
  i. Is the product within the e-commerce domain?
  ii. Is this a new product or innovative enhancement/modification to an existing product?

If the idea under consideration does not fit both of these criteria, they are channeled to the appropriate organization within or outside e-commerce or otherwise graded irrelevant. Also, there are instances when ideas are premature for the organization for various reasons (e.g., technology, market condition) and hence they are archived for future consideration.

Figure 8:
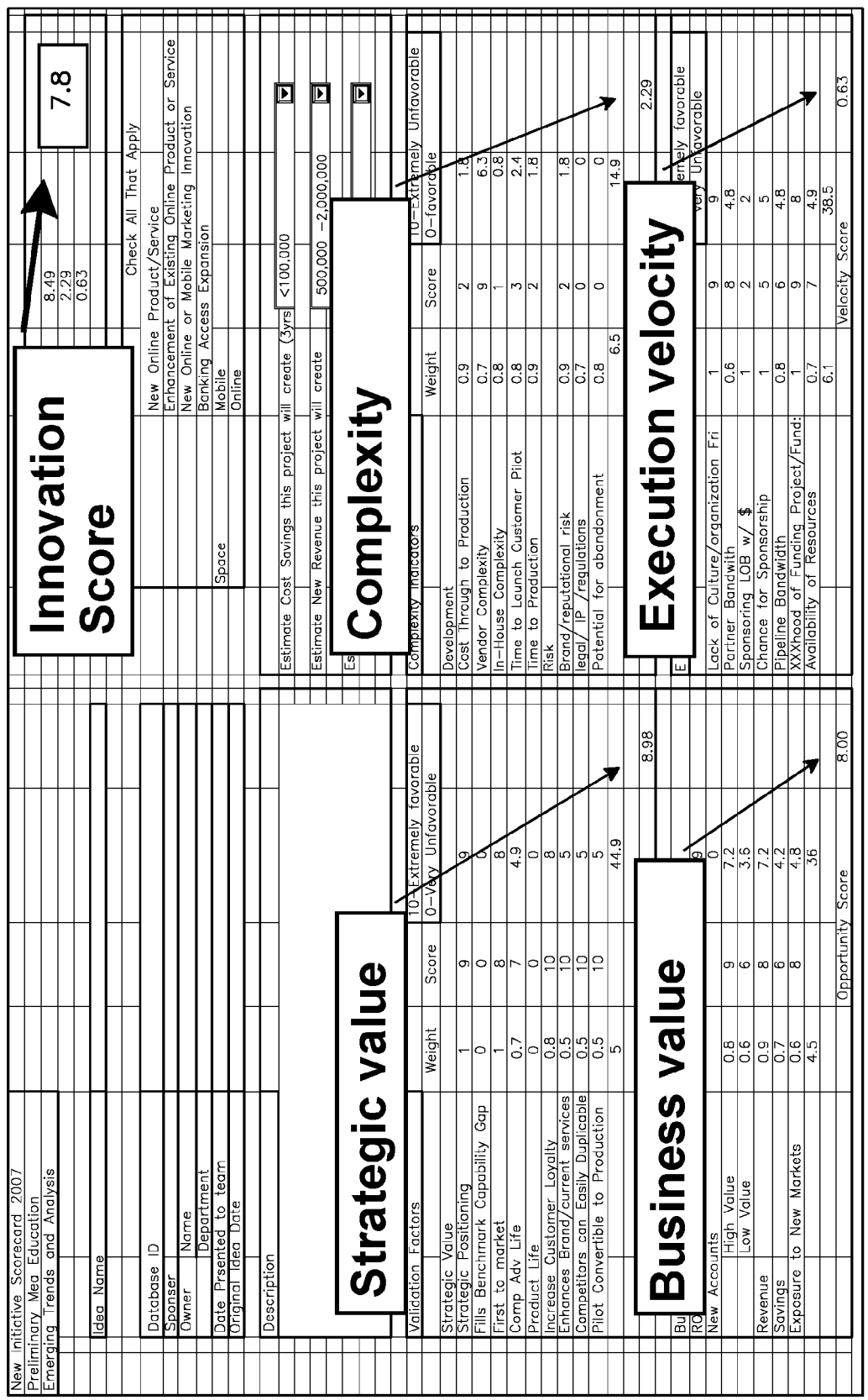
FIG. 8 illustrates an example scoreboard screen print in accordance with an aspect of the innovation.

In addition to producing or generating a scorecard as illustrated in FIG. 8, other embodiments generate reports, for example, based upon trends and LOB. Still other aspects can aggregate ratings of user quality of ideas. Still further, the innovation discloses categorization and taxonomies of ideas mapped to prevailing trends. Additionally, these aspects of phase 202 can be made available for access or dissemination, for example, via an organization-specific UI accessible by way of the Internet or intranet.

Referring now to a discussion of phase 206, the detail analysis and evaluation stage employs logic and other functionality that assist in the evaluation of ideas. It is to be understood that the granularity of the analysis can be user-, enterprise-defined or otherwise inferred as desired or appropriate.

Continuing with the example, as the high level evaluation employed a 5 day timeframe, the detailed analysis and evaluation in this example employs a 30 calendar day timeframe. Within the 30 days, the components and methodologies of this phase 206 enable a detailed analysis of an initiative candidate. In essence, phase 206 strives for a standardized process that leverages on external and internal data to analyze new ideas from multiple points of view.

Selected ideas that emerged from the high level evaluation stage (204) can now be assigned for detailed analysis and evaluation. At this time, the idea becomes a target project and is added to the team's portfolio. In this aspect, the analysis of the lifecycle evaluation component 602 can yield the following data (among other data), which can be used by the team to decide if a prototype should be built to support a business case:
  High Level Business Objective
  Product and/or Vendor Overview
  Vendor Competitive Review (if applicable)
  Vendor Scorecard (if applicable)
  Voice of Customer Data (if available)
  Industry and Market Data and Trends Manual as well as computer-assisted research and analysis can be performed to gather data in the above areas, resulting in a vendor or new service evaluation document. For example, the analysis component 106 can be employed to automatically gather the above-identified information, or subset thereof.

Upon gathering data by way of the analytic and research activities, feedback can be solicited from project 'stakeholders' (e.g., LOB management, employees, customers, partners). Based upon the findings and stakeholder input, a recommendation can be formulated to set forth whether to proceed further with the idea. In the event the recommendation is not to move forward with the project, feedback is captured and communicated to stakeholders by the analysis team project lead. In aspects, whenever a determination deems an idea appropriate to pursue, a business case document can be generated to support the idea.

Below is an example list of some of the stakeholders and respective responsibilities involved for the analysis of the example scenario above:
Internet Distribution:
  Alignment of the initiative versus the LOB's strategic Internet plan. Ensure that there are no redundant efforts in place.
Product Management/Online Services/e-Commerce PMO:
  Product owners will eventually lead the project to execution and own it in a production environment for on-going support, maintenance and enhancement. They are engaged during the analysis to ensure they have awareness of most any initiative arising in their pipeline in the near future. The activity may be as simple as information sharing so as to allow the advanced consideration of project resources down the road.
LOB and Channel Technology (IT):
  Because IT teams normally implement any new features and functionalities on the back-end within the authenticated space, most any initiative or project that belongs in this space should include the IT teams to, once again, raise awareness. In some cases, e-commerce triage can help to solicit a preliminary consultation or IT estimates. For some projects this may be invaluable for the technology insights it provides before moving forward with a prototype or pilot.
E-commerce Risk Management:
  Engaged in risk analysis for new enterprise applications or major enhancements to existing features and applications. Any new project or idea under the radar is run through this risk management team to ensure that there are no impending issues.
Ecommerce Interactive Design Group (IDG):
  IDG is engaged in almost all web development activities for nearly all online services. They ensure that there are no major usability issues with the project and analyze the web development efforts for such projects. They enable the team to forecast critical design aspects that may need to be scrutinized during the prototype or implementation phase.
IT Vendor Management:
  Certain projects will require outside vendors to support in a pilot and/or the production and development phases. This team is engaged early in the process so as to ensure that there are no issues in engaging vendors if the project so requires.
Vendors/Consultants:
  Normally involved as needed to gather proposals and or market data.
Legal/Intellectual Property:
  Certain initiatives under analysis may require legal consultation. Verify the project is within corporate legal policy and would not jeopardize customer satisfaction, overstep intellectual property rights, or compromise the brand if implemented into production.

LOB:

Provides insights, data and strategic alignment in the product area and/or is an acting partner for the project.

C.A.R.T.:

May be tapped on to provide customer data and analytics.

Turning now to a discussion of phase 208—Proof of Concept—Prototypes and Simulations, as above, the discussion follows the aforementioned e-commerce example. It is to be appreciated that this example is not intended to limit the innovation in any manner. Rather, the e-commerce examples are provided to add perspective to the process flow and components of the innovation. Accordingly, alternative examples exist which are to be included within the scope of this disclosure and claims appended hereto.

In the example, this phase (208) is expected to take between 7 and 45 days to complete. Based upon the analysis (phases 204, 206) findings and collaboration with IDG, a decision can be made to build a high level simulation (e.g., HTML, WML, iRise) or a functional prototype of an application (e.g., e-commerce or mobile application) to allow stakeholders to visualize the prospective service as well as to facilitate a 'go-' 'no-go' decision with regard to a pilot phase 212.

This phase 208 can incorporate brand, design and usability experts for high level guidance for a simulation and to a level that is sufficient to maintain momentum of a prototype grade project. Additionally, this phase 208 can identify the potential product owners under a scenario in which the product or service will reach production and consider appropriate timing for preplanning a strategy for handoff (phase 210).

One purpose of phase 208 is to create a visual presentation of the concept. The Proof of Concept (PoC) induces insight that helps clarify feasibility, may identify technical issues or usability concerns, and establishes a sense of what a real-world product might look and feel like. Further, a PoC provides staging for feedback for budgeting and other forms of business discussion and control. The due diligence from the evaluation and the PoC helps to form a basis for a 'go-' 'no-go' decision on pilot or test case with a customer sample.

Data from the analysis, the type of new product or service, and the perceived business value by executive leaders help to form an opinion on the type of PoC to pursue a simulation or prototype. Provided is a sample list of questions that can help guide the decision on which direction to take:

Is the user interface simplistic—a basic new web page, addition or change? If yes, then simulate.

Is the product outside basic web domain such as an application-based solution and cannot be simulated with iRise? If yes, is there a vendor with a white label solution to demo as a prototype.

Does it integrate customer account data? Raises complexity, consider simulation without customer data. If the business case warrants, consider options for moving towards a pilot.

Does it require a multitude of system integrations?

Can this be executed in-house or outsourced, will it go beyond 45 days to develop and use?

Is it an out-of-the-box vendor solution or $3^{rd}$ party system integrated solution?

Would it affect online security or activities or risk to other business units?

As described above, these and other questions can be presented in the form of a UI, template, wizard or the like in order to capture the information from a user. If the simulation is complex in nature, the emerging trends and analysis team works closely with IDG to schedule the prototype build. In either scenario, the teams have multiple development options available. For example, the iRise Studio-brand software is one such tool currently in use within e-commerce to rapidly simulate a web interface. Additionally, the innovation contemplates development and use of custom computer software applications and components.

Figure 9:
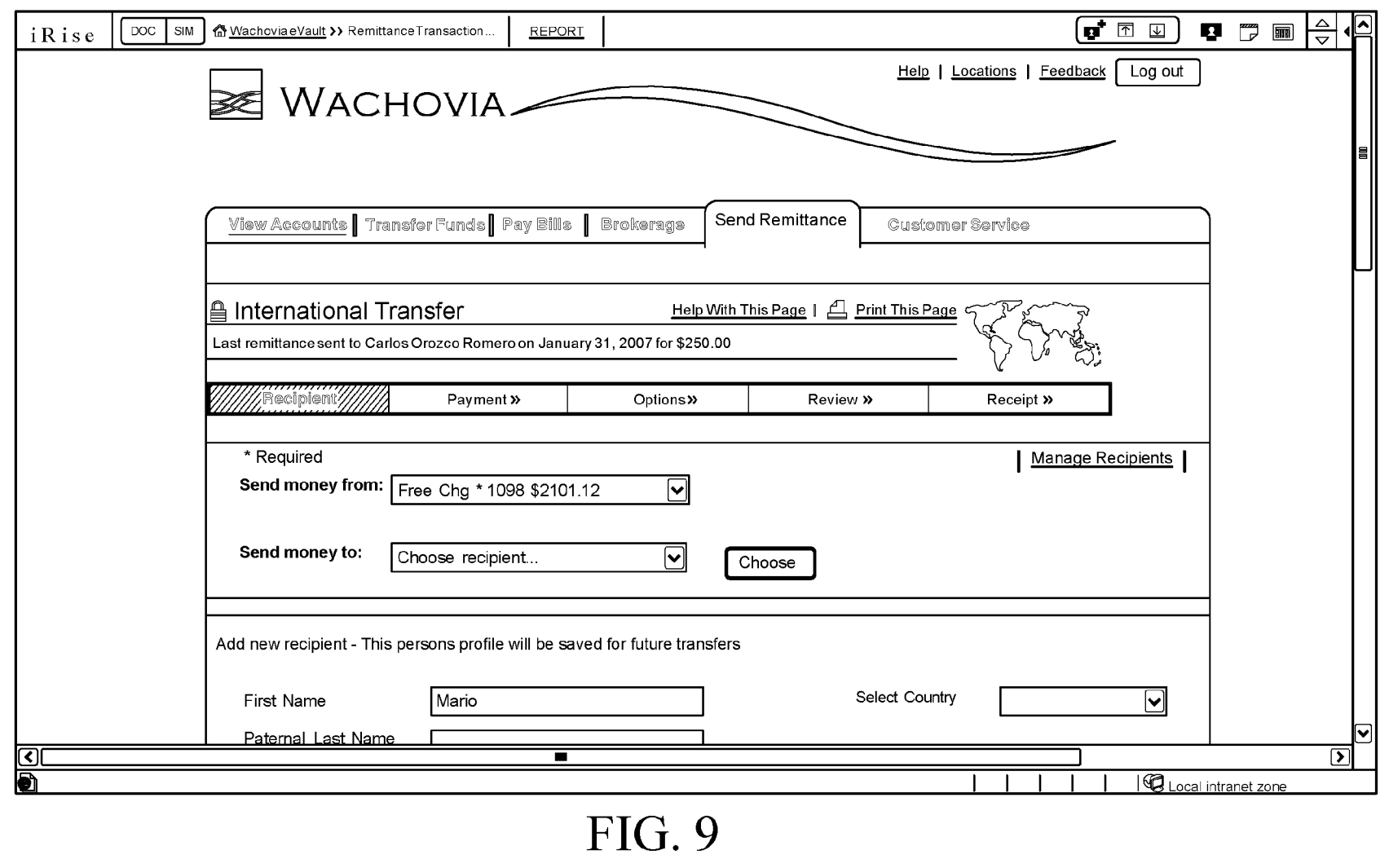

In operation, a joint predevelopment session can convene to address these design elements before the work begins. This cross-functional collaboration can yield a quick wire-frame and general guidelines for the developer to reference for the moch-up or prototype. FIG. 9 illustrates an example iRise Studio-brand simulation in accordance with an aspect of the innovation.

Turning now to a discussion of a functional prototype, if the prior analysis and evaluation results dictate or suggest a functional prototype to make a final go-to-pilot decision then either a formal project is pursued to garner resources or a vendor is solicited. Constructing a functional prototype or testing a vendor's solution could have a longer cycle based on the type of the project, nature of the technology, and level of impact on the organization. At times these are larger scale initiatives that could potentially be disruptive in nature to the industry or enterprise. These types of projects often are pushed to a pilot phase 212.

Some of the stakeholders that may become involved in this stage (in accordance with the example) include:

IDG—Involved in building or providing guidance related to user interfaces

IT Vendor Management—Facilitates the sourcing process whenever a vendor is leveraged to deliver the functional prototype BIS—Requirements and testing, as needed Vendors—provide functional prototypes as needed. These may or not have vendors costs associated with them. As a best practice, the ET&A team normally attempts to get the vendor to invest in the project/relationship by providing a working functional prototype at this stage of the process CIS—provide a security lens, whenever appropriate In order to facilitate development or customization of functional prototypes, the team can prepare the business documents necessary for designers and developers to produce the prototype. The emerging trends and analysis team can closely monitor the progress of these projects along with the product owners/managers or team leaders from the respective projects that take part in this phase (208). They also ensure the project is on track and is completed within the specified time either by manually tracking or employing computer-assisted mechanisms to track. In case of delays or any major issues, assigned team members can make the final decision and notify all groups involved in such projects.

Once a functional prototype is completed, the results are analyzed by the analyst and other team members who participated in such a project. Based on the success criteria and the cumulative expertise of the entire team, a decision is made on whether to proceed or not with a bona-fide, customer facing pilot (handoff phase 320). In the event that an agreement is reached to pursue a pilot, the team can produce a Pilot Success Criteria document which, in this example, is fundamental in helping both e-commerce and the LOB decide whether to move a service from pilot to production at a future time.

If the decision to proceed no further than the functional prototype at this stage, a formal communication is sent to (e.g., all) initiative stakeholders explaining the rationale behind the decision, as well as data supporting the decision. In this example, this would mark the end of the initiative. If the decision is to move forward with a pilot or production, the project can then be formalized within the standard (e.g., e-commerce) project processes (e.g., Triage, Sr. Triage . . . ).

Continuing with the aforementioned example, the handoff phase 210 is estimated at <=10 calendar days. Here, this phase 210 includes the project handoff to the execution team (s) in line to take the prototype and the analysis results into pilot or production. In operation, it can be helpful to identify a likely product manager (e.g., either within e-commerce online services or the LOB) early in order to create a planning strategy for transition out of ETLM and into a post pilot production environment.

In aspects, at the end of the PoC and/or PoBV (proof-of-business value) several outcomes are possible:
  A decision to go back to the drawing board and modify the requirements to proceed further—typically this happens if the PoC/PoBV requires significant changes to the requirements due to technical or system implementation difficulties or an inadequate vendor.
  Terminate the project (based on a faulty business case, negative Voice of the Customers, implausibility of user experience et cetera).
  Move forward with pilot or production—package all information pertinent to the initiative and package it together in preparation for hand off to the execution team(s).

Upon successful PoBV transition, the execution teams are defined as the production level managing owners of the approved product, the project managers for development and other relevant stakeholders. Some planning for the transition should have taken place with the designated teams prior. At this time, the role of the emerging trends team most often shifts to a consulting capacity.

Other activities that can be employed for transition include, but are not limited to:
  Formal handoff meeting to discuss:
    The result of the PoC/Pilot
    Transistionary activities for the product and business owners
  Compile PoBV documents including:
    The initiative details and business case
    The summary of the above mentioned meeting proceeding
    Agreed next steps
  If the decision is made to end the project of interest, the emerging trends team is responsible for a final evaluation statement of project termination
  Report out to senior leaders tracking the initiative The handoff process can ensure that all parties are notified formally on the outcome of the prototyping phase (208) and the expectations for immediate next steps. In most cases, the next steps are in the hands of the product or business owners. Handoff is primarily related to the ownership, support, operations and future development/enhancements of the service/product. Conventionally, much of the transition takes place informally. The innovation discloses definitions of a template for handoff and a set the guidelines for the transition meeting.

Turning now to a discussion of performance and metrics, in order to empirically measure the effectiveness of the process details outlined in this specification, a set of performance metrics have been developed. Under the model, in the example aspect, performance is measured in terms of at least the three perspectives currently used by e-commerce to measure performance, namely: Financial Perspective, Customer Perspective and Operational Perspective. Each of these perspectives is described in greater detail infra.

From a financial perspective, e-commerce measures the success of its emerging trends portfolio management efforts in terms of Return on Innovation (ROI), which can be calculated by dividing total investment plus a 12% Hurdle Rate (Denominator) into the Revenues and/or Savings Generated within 3 years of introducing the service to market (Numerator). It is to be understood that financial perspective can be calculated in alternative calculations, which are to be included within the scope of the innovation.

The total investment, in turn, is the proportional allocation of the team's time/salaries+the total project cost (including vendor fees and internal enterprise/organizational costs). To calculate the first variable, the team takes the total time that the project was in emerging trends (e.g., 3 months) before it is handed off and the team's allocation to the project and factor it against compensation. The portfolio's ROI is the sum of all the initiatives' individual ROI's. In order to illustrate overall performance during a measurement period, the example indicators of FIG. 10A are used.

As shown in FIG. 10A, if the ROI Index is equal to or less than 0.88, then the color red can be assigned to performance. Similarly, if the ROI index is between 0.89-1.00 or equal to or greater than 1.01, then the colors of yellow and green respectively can be assigned to the performance. Because there are certain new services for which it is difficult to calculate a 3 year revenue stream or savings, there may be some inherent limitations with this measurement model. In addition, the model can be refined to intangibles associated with introduction of new services, such as, but not limited to branding, positioning, etc.

From a customer perspective, one prevailing measure is stated in terms of a Completion Index which fundamentally measures the number of new services that are introduced to customers during a given fiscal year. For example, during the 2007 fiscal year, the emerging trends and analysis team was charged with introducing at least two new e-commerce/mobile services. Because ultimately, the customer may only benefit from innovation efforts to the extent that they become products for them, the number of these services (as stated in a completion index) becomes a natural metric.

For this metric, the indicators illustrated in FIG. 10B can be used. As illustrated, a red light can be used to indicate that no new services were launched during the measurement period. Yellow and green can indicate 1 and '2 or more' services respectively were launched during the measurement period. It is to be understood that the indicators illustrated in FIG. 10B (and FIG. 10 generally) are examples and that other types of indicators and criteria for indicators exist which are to be included within the scope of this disclosure and claims appended hereto.

From an operational perspective, because time to market is fundamentally important in the introduction of new services, Proof-of-Business Value Velocity can be selected as an important operational metric in the ETLM process. This index can be measured by calculating the average number of calendar days that a particular initiative stays in the ETLM process. This can be tracked using the example portfolio tracking matrix as illustrated in FIG. 11.

In an example, using the average number of days in the process, the ET&A Director manages to a target of an average of a maximum 100 calendar days in the process. This metric can employ the indicators illustrated in FIG. 10C.

As shown in FIG. 10C, a red indicator can be employed if the variance is greater than 20% of 100 calendar days. Similarly, a yellow indicator can be used if there is a negative variance which is less than 20% of 100 calendar days. Still further, a green indicator can be used if the variance is 100 calendar days or less. As described above, these criteria are user defined (or inferred on behalf of an entity) based upon most any factor, including, but not limited to, LOB, project type, urgency, importance, budget, etc.

Although the ending event that determines exit from the ETLM process may seem disparate, the rule used to make this determination can be simply the hand-off point as determined by the engagement type. Successfully managing to the target number (e.g., 100) calendar day average allows the team to incubate more initiatives over a time period, thus improving the enterprise's ability to innovate faster.

Figure 12:
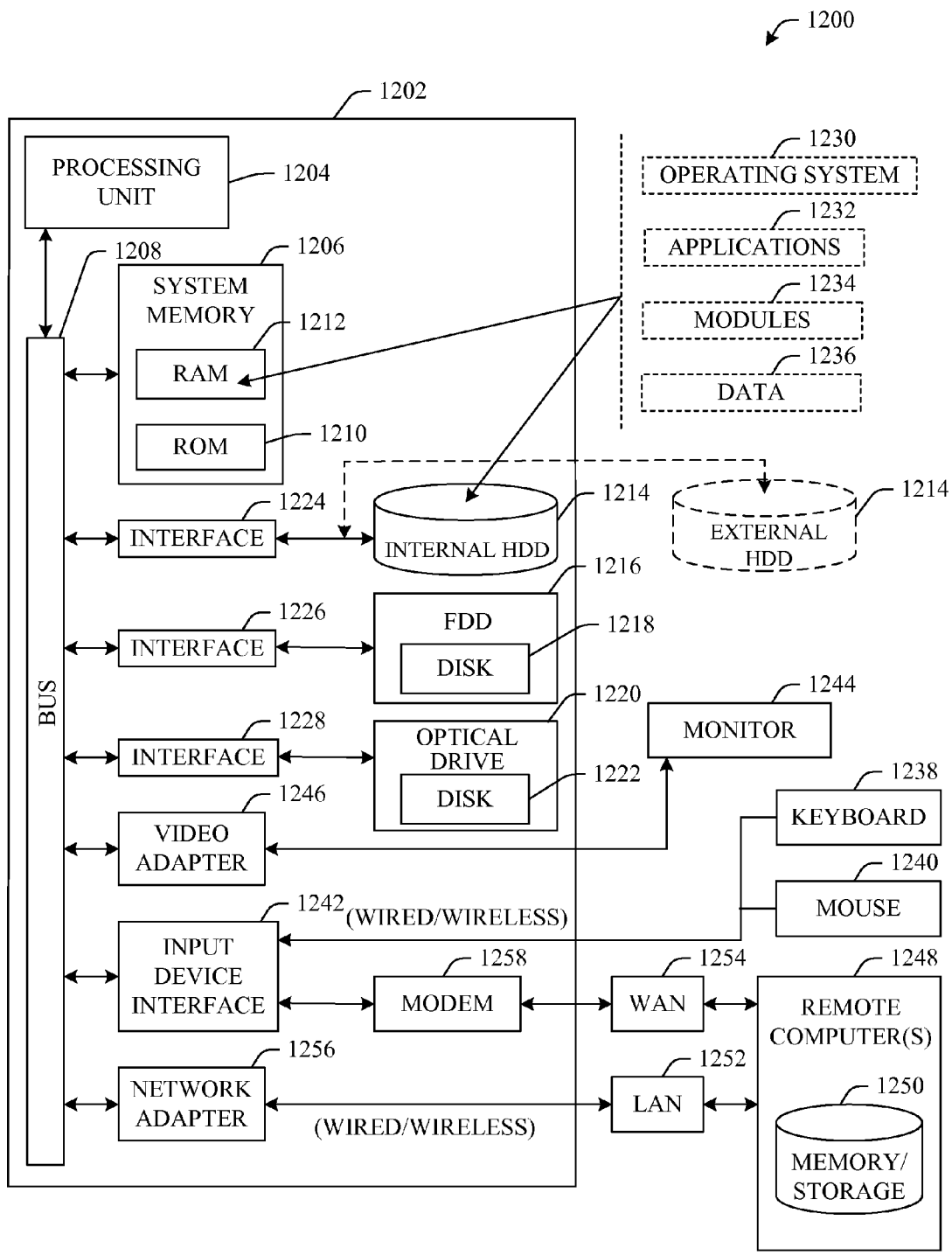
FIG. 12 illustrates a block diagram of a computer operable to execute the disclosed architecture.

Referring now to FIG. 12, there is illustrated a block diagram of a computer operable to execute the disclosed architecture. In order to provide additional context for various aspects of the subject innovation, FIG. 12 and the following discussion are intended to provide a brief, general description of a suitable computing environment 1200 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 12, the exemplary environment 1200 for implementing various aspects of the innovation includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures may also be employed as the processing unit 1204.

The system bus 1208 can be any of several types of bus structure that may further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during start-up. The RAM 1212 can also include a high-speed RAM such as static RAM for caching data.

The computer 1202 further includes an internal hard disk drive (HDD) 1214 (e.g., EIDE, SATA), which internal hard disk drive 1214 may also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 1202, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the innovation can be implemented with various commercially available operating systems or combinations of operating systems.

A user can enter commands and information into the computer 1202 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc.

A monitor 1244 or other type of display device is also connected to the system bus 1208 via an interface, such as a video adapter 1246. In addition to the monitor 1244, a computer typically includes other peripheral output devices (not shown), such as speakers, printers, etc.

The computer 1202 may operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 13:
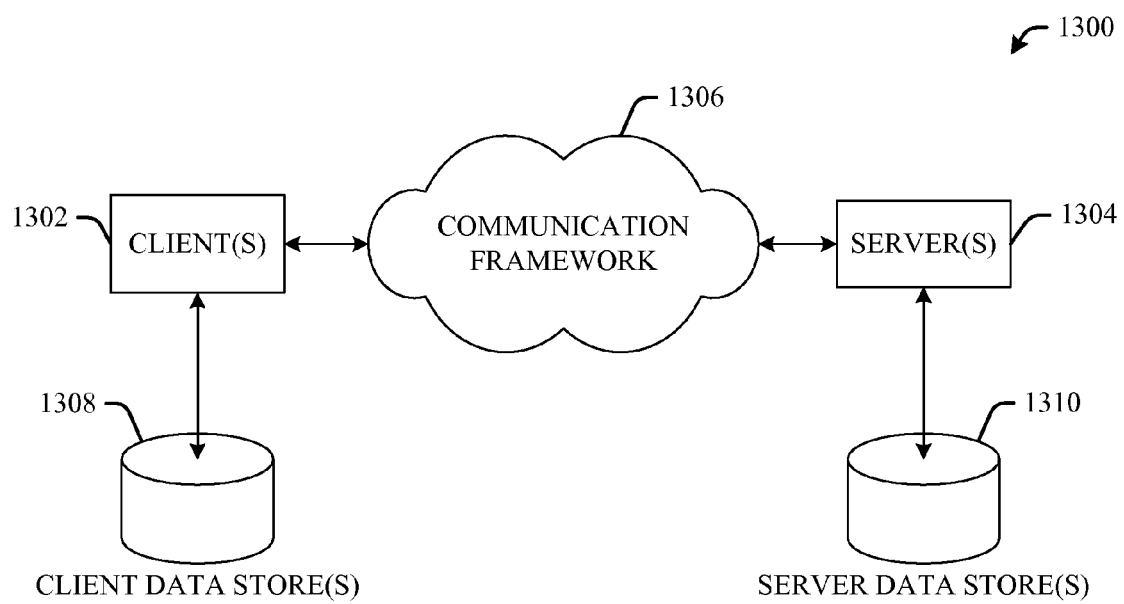
FIG. 13 illustrates a schematic block diagram of an exemplary computing environment in accordance with the subject innovation.

Referring now to FIG. 13, there is illustrated a schematic block diagram of an exemplary computing environment 1300 in accordance with the subject innovation. The system 1300 includes one or more client(s) 1302. The client(s) 1302 can be hardware and/or software (e.g., threads, processes, computing devices). The client(s) 1302 can house cookie(s) and/or associated contextual information by employing the innovation, for example.

The system 1300 also includes one or more server(s) 1304. The server(s) 1304 can also be hardware and/or software (e.g., threads, processes, computing devices). The servers 1304 can house threads to perform transformations by employing the innovation, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented method of managing a lifecycle of an application, comprising:
   receiving at a processor an idea wherein the idea relates to one of a generation or modification of the application;
   analyzing, by the processor, the idea based upon a set of metrics;
   establishing a scoreboard based upon the analysis to quantify the idea; and
   determining a viability of the idea based upon the scoreboard,
   wherein the scoreboard includes a strategic value component, a business value component, an innovation score component, a complexity component and an execution velocity component that quantifies the idea based upon at least one of a policy, preference, threshold or benchmark.

2. The computer-implemented method of claim 1, wherein the idea relates to at least one of an e-commerce, online or mobile banking service.

3. The computer-implemented method of claim 1, further comprising categorizing the idea with a plurality of previously captured ideas.

4. The computer-implemented method of claim 1, wherein the act of analyzing the idea comprises performing a high-level analysis that determines a benefit of the idea to an enterprise.

5. The computer-implemented method of claim 1, wherein the act of analyzing the idea comprises performing a detailed analysis that employs the set of metrics to establish at least one of value or usability to an enterprise.

6. The computer-implemented method of claim 1, further comprising generating a prototype of the idea, wherein the prototype promotes the idea.

7. The computer-implemented method of claim 6, wherein the prototype is a functional prototype.

8. The computer-implemented method of claim 6, wherein the prototype is a visual prototype.

9. The computer-implemented method of claim 1, wherein the idea is captured and tracked by way of a wild-style interface.

10. The computer-implemented method of claim 1, wherein the set of metrics includes a measurement of a financial perspective, a customer perspective and an operational perspective.

11. The computer-implemented method of claim 10, wherein a financial perspective is measured as a function of return on investment (ROD.

12. The computer-implemented method of claim 10, wherein a customer perspective is measured as a function of completion index.

13. The computer-implemented method of claim 10, wherein an operational perspective is measured as a function of proof-of-business value velocity (PoBV).

* * * * *